United States Patent
Brunea

(10) Patent No.: US 7,901,831 B2
(45) Date of Patent: Mar. 8, 2011

(54) ION-EXCHANGE MEMBRANES STRUCTURED IN THE THICKNESS AND PROCESS FOR MANUFACTURING THESE MEMBRANES

(75) Inventor: John A. Brunea, Brussels (BE)

(73) Assignee: SOLVAY (Société Anonyme), Brussels (BE)

( * ) Notice: Subject to any disclaimer, the term of this patent is extended or adjusted under 35 U.S.C. 154(b) by 819 days.

(21) Appl. No.: 11/577,044

(22) PCT Filed: Oct. 10, 2005

(86) PCT No.: PCT/EP2005/055116
§ 371 (c)(1),
(2), (4) Date: Apr. 11, 2007

(87) PCT Pub. No.: WO2006/040305
PCT Pub. Date: Apr. 20, 2006

(65) Prior Publication Data
US 2009/0029215 A1 Jan. 29, 2009

(30) Foreign Application Priority Data
Oct. 12, 2004 (FR) .................................. 04 10726

(51) Int. Cl.
*H01M 8/10* (2006.01)
(52) U.S. Cl. ....................... 429/492; 429/493
(58) Field of Classification Search .................... 429/30
See application file for complete search history.

(56) References Cited

U.S. PATENT DOCUMENTS 5,994,426 A 11/1999 Nezu et al.
6,242,123 B1 6/2001 Nezu et al.

FOREIGN PATENT DOCUMENTS

JP 2004 59752 2/2004

OTHER PUBLICATIONS

Gupta, Bhuvanesh, Felix N. Buchi, Gunther G. Scherer, and Adolphe Chapiro. "Crosslinked Ion Exchange Membranes by Radiation Grafting of Styrene/divinylbenzene into FEP Films." Journal of Membrane Science 118 (1996): 231-38.*
Gupa, et al.,"Crosslinked Ion Exchange Membranes by Radiation Grafting of Styrene / Divinylbenzene into FEP Films", Journal of Membrane Science, vol. 118, No. 2, pp. 231-238, 1996.

* cited by examiner

Primary Examiner — Dah-Wei D Yuan
Assistant Examiner — Stephan Essex
(74) Attorney, Agent, or Firm — Oblon, Spivak, McClelland, Maier & Neustadt, L.L.P.

(57) ABSTRACT

Monolayer ion-exchange membrane structured in the thickness comprising ion-exchange sites covalently bonded to a support polymer, the membrane comprising two surface zones located on either side of a mid-zone, each surface zone having a thickness of not more than 15% of the total thickness of the membrane, in which the surface zones have a mean ion-exchange site density $D_{surface}$ calculated on the thickness of the surface zones of at least $D_{total}$.

13 Claims, 2 Drawing Sheets

ION-EXCHANGE MEMBRANES STRUCTURED IN THE THICKNESS AND PROCESS FOR MANUFACTURING THESE MEMBRANES

The invention relates to ion-exchange membranes structured in the thickness. The invention also relates to a process for manufacturing them and to their use.

The term "ion-exchange membrane structured in the thickness" means a membrane that has in its thickness a controlled gradient of properties, for instance its ion-exchange capacity, the surface exchange capacity being different from that in the core of the membrane.

Ion-exchange membranes are well known in the art. Their capacity to be selectively permeable to anions or to cations gives them many uses. The membrane electrolysis of sodium chloride solutions for the joint production of chlorine and sodium hydroxide, electrodialysis, which itself has numerous applications such as water treatment, and, finally, fuel cells are examples of technologies using ion-exchange membranes.

Fuel cells allow electrical and heat energy to be produced in high yield and with a reduced level of pollution, which gives them a promising future. However, their high cost still prevents their widespread use, and as such any improvement that can lead to a reduction in their cost is desirable.

One known type of fuel cell comprises as main constituent an ion-exchange and more particularly a proton-exchange polymer membrane, which acts as a solid electrolyte sandwiched between two electrodes: this assembly separates two chambers into which are respectively introduced, in a known manner, a fuel and an oxidizing agent, the chemical reaction of which (electro-oxidation) allows an electric current to be collected at the electrodes. To this end, the membrane is pressed between two electrodes coated with a catalytic metal such as platinum. As a variant, the membrane-electrodes assembly comprises catalytic coatings formed in situ on the faces of the membrane.

Among the various types of fuel that may be used in fuel cells, hydrogen and methanol are the ones that have been the most intensively studied. Methanol has the advantage of easy storage. Furthermore, methanol may be obtained in various ways, for example from natural gas or from renewable sources such as wood or biomasses.

Certain fuel cells use methanol only indirectly, since it is first converted into hydrogen before being reacted with the oxidizing agent. In other fuel cells, the reaction of methanol is direct. These cells will be referred to hereinbelow as Direct Methanol Fuel Cells—DMFC.

In a DMFC, the following reactions take place at the electrodes:

At the cathode: $O_2+4H^++4e^-\rightarrow 2H_2O$

At the anode: $CH_3OH+H_2O\rightarrow CO_2+6H^++6e^-$

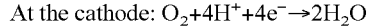
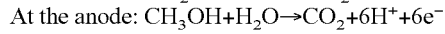

The membrane used as separator in such a fuel cell must satisfy specific and strict requirements, since its physicochemical properties have a considerable influence on the performance qualities of the cell. In particular, important parameters thereof are the proton conductivity and the fuel impermeability.

In order to improve the fuel impermeability of cationic membranes used in DMFCs, it is known practice (WO 98/28811) to use multilayer membranes consisting of cation-exchange groups grafted onto a support polymer, the various layers having different exchange-site densities. However, these known membranes are complex to produce. Furthermore, their overall ion conductivity is insufficient.

The invention is directed towards providing, in a simple manner, ion-exchange membranes that show improved impermeability while at the same time retaining excellent ion conductivity. In particular, the invention is directed towards providing membranes which, when used in DMFCs, have improved ion conductivity and impermeability to methanol.

Figure 1:
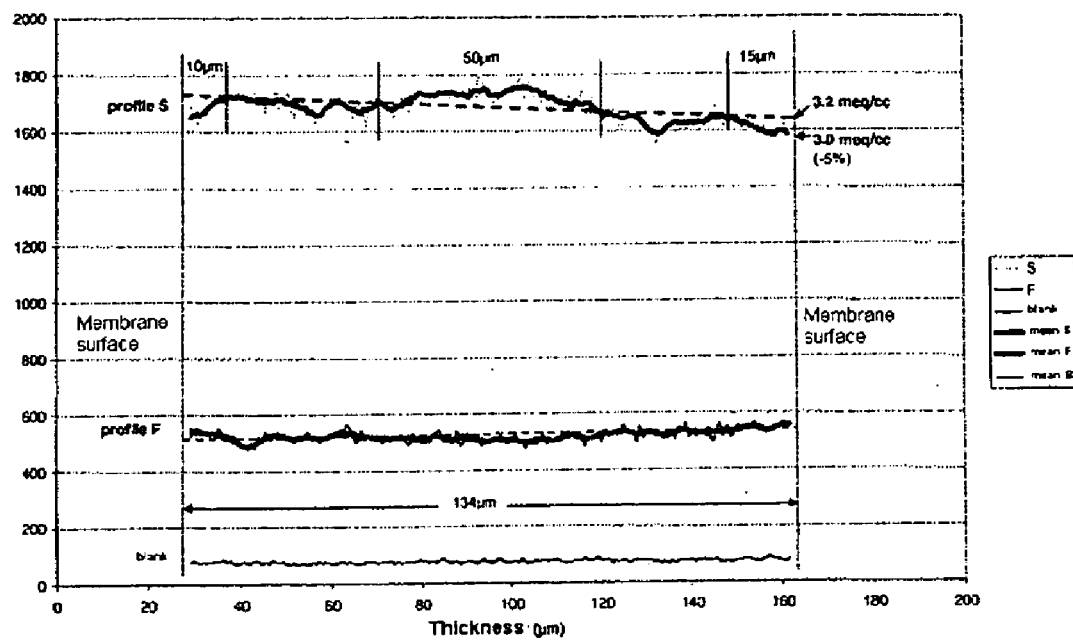
FIG. 1 describes the profile of sulfur distribution in the thickness of a grafted film.

Consequently, the invention relates to a monolayer ion-exchange membrane comprising ion-exchange sites covalently bonded to a support polymer, the membrane having a mean ion-exchange site density $D_{total}$ of at least 1.2 meq/cm³ when it is calculated on the total thickness of the membrane, the membrane comprising two surface zones located on either side of a mid-zone, each surface zone having a thickness of not more than 15% of the total thickness of the membrane, in which the surface zones have a mean ion-exchange site density $D_{surface}$ calculated on the thickness of the surface zones of at least $D_{total}$.

The term "monolayer ion-exchange membrane" means a membrane not having an interface in its thickness. Such a membrane is thus distinguished from multilayer membranes, which result from the superposition of two or more thin membranes or from successive overlapping of a membrane with additional outer layers. A monolayer membrane has a continuous evolution, in the direction of the thickness, of its main macroscopic material parameters, such as its density, its ion conductivity or its mechanical properties. The absence of interfaces and of discontinuities in a monolayer membrane presents many advantages, for instance better ion conductivity, the absence of risk of delamination, and fewer internal tensions and thus less deformation on wear.

The ion-exchange membrane may be of the cationic or anionic type, depending on whether it is selectively permeable to cations or to anions, respectively. The ion-exchange sites that it comprises may be of various known types, for instance, and depending on the type of membrane, carboxyl, sulfonate or trimethylammonium groups.

The membrane according to the invention is particularly advantageous when it is intended for proton transfer and comprises sulfonate exchange sites.

The membrane according to the invention has, in combination:

an increased density of exchange sites in the surface zone, such that $D_{surface}$, calculated on the thickness of the surface zones, is at least $D_{total}$, and a mean density of exchange sites calculated on the total thickness of the membrane, $D_{total}$, of at least 1.2, advantageously 1.75 and preferentially 2.5 meq/cm³. Membranes with $D_{total}$ values of at least 3 and preferably 3.5 meq/cm³ are particularly advantageous.

In order to obtain $D_{total}$, expressed in meq/cm³, the overall exchange capacity of the membrane, expressed in meq/g, measured according to French standard AFNOR NF X45-200, December 1995, is taken and is multiplied by the density of the membrane, expressed in g/cm³.

These membranes thus have a site density that is at least as large at the surface, relative to the mean value on the thickness, combined with a sufficient mean density. These two properties ensure good overall conductivity for the membrane and distinguish them from certain known ion-exchange membranes that have a low mean exchange-site density on account of an excessive lack of exchange sites in their central zone. Such membranes may, admittedly, have a high exchange-site density at the surface relative to the mean value over the total thickness, but they have an ion conductivity that is insufficient for their practical use.

Moreover, the inventors have observed that the various surface physicochemical properties of membranes have a direct impact on their performance qualities. Specifically, for example in the electrode-fuel cell membrane assembly, the quality of the interface between the electrode and the membrane plays an essential role. It is at this interface that the electrocatalytic phenomena are the greatest. It is the exchange sites that are at the surface of the membrane which ensure, together with the catalyst and the electrode, the equilibrium between the ion conduction through the membrane and the electron conduction in the electrode. The exchange-site density in the surface zone of the membrane thus directly affects the contact with the catalyst and thus the functioning of the fuel cell.

The high density of exchange sites in the surface zone of the membrane according to the invention also has the advantage of making the membrane more hydrophilic. In the case, for example, of fuel cells, the electro-osmotic thrust leads to dehydration of the membrane, which is harmful to its ion conductivity. In order to maintain the correct water content of the membrane, which is necessary for its functioning, a continuous supply of water is thus needed. This supply is facilitated if the surface of the membrane is sufficiently hydrophilic.

The mean densities $D_{surface}$ and $D_{total}$ are calculated from a site density profile established over the entire thickness of the membrane. The mean values are obtained by integrating the site density over the thickness of the desired zone. In practice, on the graph representing the site densities (or any magnitude proportional thereto) as a function of the thickness, the mean value is the value such that the surface area of the profile located above the mean value is equal to the surface area of the profile located below it. To obtain $D_{surface}$, the operation is performed only on the surface layers, whereas to obtain $D_{total}$, the operation is performed on all of the thickness.

In the case of a cationic membrane comprising ion-exchange sites of sulfonate type, the exchange site density in the surface zone may be very rapidly and easily demonstrated by placing the surface of the membrane in contact with methylene blue (tetramethylthionine hydrochloride —$C_{16}H_{18}SN_3Cl$). This stain has a high molecular weight, which reduces its penetration into the membrane. In the case of the membrane according to the invention, the methylene blue is fixed on contact with the surface sulfonate groups and gives a strong blue colour. By comparison, the known membranes containing few surface exchange sites react little with the stain and the blue colour is markedly less pronounced, or even does not appear at all.

According to the invention, the surface zone in which the exchange site density is high has a maximum thickness of 15% of the total thickness of the membrane. It is the mean density of exchange sites in this zone, $D_{surface}$ that should be at least equal to the mean density, calculated over the entire thickness, $D_{total}$.

In one recommended variant of the invention, the thickness of each surface zone is no more than 10%, advantageously 8%, preferentially 5% and even more preferentially 2% of the total thickness of the membrane. The membranes in which the thickness of each surface zone is no more than of 1% of the thickness are particularly advantageous. Specifically, these membranes have a high exchange site density in their uppermost layers.

In the exchange membrane according to the invention, $D_{surface}$ is at least equal to $D_{total}$.

As outlined above, when these membranes are used in fuel cells, they have a surface zone site density that is sufficient to ensure good ion conductivity on contact with the electrode and the catalytic layer.

In one preferred embodiment of the membrane according to the invention, $D_{surface}$ is at least 1.05, advantageously 1.1, more advantageously 1.15 and even more advantageously 1.2 $D_{total}$.

In this embodiment, the extremely high density of exchange sites on the surface zone of the membrane gives them exceptional performance qualities, in particular in fuel cells.

In the membrane according to the invention, the ion-exchange sites, for example carboxyl, sulfonate or trimethylamine groups, are covalently bonded to a support polymer. This polymer should especially ensure the mechanical strength of the membrane and its dimensional stability and should have the necessary chemical resistance suited to the medium in which it is in service. Many support polymers have already been used successfully in ion-exchange membranes. This is thus the case, for example, for:

fluorinated polymers such as polytetrafluoroethylene (PTFE), polyvinyldene fluoride (PVDF), perfluorinated poly(ethylene-propylene) (FEP) and ethylene-polytetrafluoroethylene copolymers (ETFE);

polyolefins (polyethylene and polypropylene);

aromatic polymers such as polyphenylene sulfide (PPS), polyphenylene oxide (PPO) and polysulfone (PSU);

polyamides.

To obtain a membrane intended for radiochemical grafting, the support polymer is used by any means suited to the thickness and to the dimensions of the membrane to be obtained and also to the necessary precision thereof. For small membranes with a large thickness of high precision, injection techniques may be suitable. Usually, the membrane is used by extrusion or calendring. The ion-exchange sites may be linked to the support polymer before or after implementing it in membrane form. They are preferably linked to the support polymer after implementing it in membrane form.

In order for the ion-exchange membrane to have, according to the invention, an ion-exchange site density $D_{surface}$ calculated on the thickness of the surface zones, which is at least $D_{total}$, it is necessary to be able to control, during the production of the membrane, the ion-exchange site density in the profile of its thickness. This control may be obtained in various ways. For example, it is advantageous to use two support polymers of different molecular weights to produce the membrane, the polymer of lower molecular weight having a higher grafting reactivity. The two polymers are mixed together before or during the extrusion of the membrane. According to the well-known laws of rheology of plastics, during the extrusion of a polymer melt blend comprising a part with a higher molecular weight (and thus a higher viscosity) and a part with a lower molecular weight (and thus a lower viscosity), the part with the lower molecular weight has a tendency to migrate during the extrusion to the surface zone of the membrane. Since the polymer having the higher grafting reactivity is at the surface, a membrane having a higher exchange site density in the surface zones will be obtained after grafting and functionalization.

The ion-exchange sites may be linked to the support polymer by any suitable technique. However, in one preferred variant of the membrane according to the invention, it is obtained via a process including a step of radiochemical grafting. Radiochemical grafting is a technique for producing copolymers in which a support polymer (which may itself be a homopolymer or a copolymer) is subjected to high-energy radiation intended to create reactive radicals therein. In combination with the irradiation, the polymer is placed in contact with a composition comprising the monomer that it is desired to graft. This monomer, which is advantageously styrene, polymerizes on the sites made active by the radiation. The grafted groups may then be converted into ion-exchange groups by means of an additional functionalization treatment (such as sulfonization, phosphonation, amination, carboxylation, etc.). Control of the experimental parameters of the radiochemical grafting step, such as those relating to the irradiation and to the nature of the composition comprising the monomer, thus has a direct impact on the control of the structuring in the thickness of the exchange capacity of the membranes obtained. The radiation used for the irradiation may be electromagnetic, such as X-rays or gamma rays, or may consist of charged particles such as electrons. Beta radiation, consisting of electrons having a sufficient energy, for example at least 0.5 MeV and preferably at least 1 MeV, may be suitable. It is usually preferable for the radiation not to exceed 20 MeV, values ranging from 1.5 to 10 MeV being recommended. This radiation should be applied to the support polymer for the time required to obtain a sufficient amount of reactive radicals. This results in an irradiation dose, expressed in kGy (kilograys), one gray being equal to $10^4$ ergs/gram. The irradiation dose depends on the sensitivity of the polymer to radiation. When the support polymer is ETFE, times corresponding to doses of between 20 and 100 kGy have been seen to be suitable. The irradiation may be performed when the polymer is in contact with the composition comprising the monomer. It may also be performed beforehand. In this case, the irradiated polymer is advantageously kept at low temperature, while awaiting its contact with the composition comprising the monomer. For the production of membranes according to the invention, it is recommended to irradiate the support polymer, already implemented in membrane form. It is also recommended for the irradiation to be performed before placing the polymer in contact with the composition comprising the monomer.

The composition comprising the monomer may also comprise various additives to control the grafting and the polymerization. It is recommended to use a polymerization inhibitor, preferably one with high steric hindrance, such as methylene blue (tetramethylthionine hydrochloride —$C_{16}H_{18}SN_3Cl$), preferably with a slow-diffusing chain-transfer agent such as hexanethiol or dodecanethiol, the latter being preferred, these two additives possibly being combined advantageously with a curing agent, for instance divinylbenzene.

The presence of at least one such additive in the grafting composition ensures better control of the grafting and, in particular for the inhibitor, maintains the efficacy of the composition by reducing the polymerization of the monomer within the composition itself.

When the irradiated membrane is placed in contact with the composition comprising the monomer, the grafting proceeds by progression of a front from the surface inwards. Without wishing to be bound by a technical explanation, the inventors consider that the control of the mechanism of progression of the front makes it possible to improve the structuring of the membrane in its thickness and in particular to obtain excellent control of the degree of grafting. Under certain circumstances, the kinetics of progression of the front are such that it is possible to obtain structuring of the membrane by varying over time only the composition comprising the monomer.

Consequently, the invention also relates to a process for producing radiochemically grafted membranes, in particular ion-exchange membranes, structured in the thickness, in which a membrane is irradiated and is placed in contact successively with at least two different grafting compositions each comprising at least one monomer to be grafted.

The monomers included in the grafting compositions may be identical or different. When they are different, the membrane will have in its thickness a structuring of its chemical composition. This spatial structuring in the thickness will depend on the temporal variation of the grafting compositions, the monomer included in the grafting composition subsequently placed in contact with the membrane being grafted in the outermost layers of the membrane relative to the monomer included in the compositions previously placed in contact. When the grafting compositions comprise several monomers, and when the membrane is placed in contact with a larger number of different grafting compositions, it is possible to gradually vary the monomer content of the various grafting compositions and to obtain a membrane that has in the thickness a chemical composition gradient that is proportionately more continuous the more gradually the content of the various grafting compositions is varied.

In one recommended embodiment of the process according to the invention, at least one grafting composition subsequently placed in contact with the membrane comprises a barrier monomer that is absent from at least one composition previously placed in contact. The term "barrier monomer" means a monomer which, when it is present in the grafting composition, gives rise to a material that has a permeability less than that which it would have in the absence of the barrier monomer in the grafting composition. In the process according to the invention, the permeability considered is the permeability to the fluid with which the membrane is placed in contact when it is in service. In the case of membranes for fuel cells, the gaseous or liquid fluid will be the fuel. When the fuel is methanol, chloromethylvinylbenzene is an example of a monomer that gives rise to an efficient barrier layer. In this embodiment, the membrane obtained has in its surface zones a barrier layer that is absent from its innermost layers.

When at least two of the various grafting compositions comprise the same monomer(s), they may advantageously comprise different additive contents or even different additives. As outlined above, the grafting compositions frequently comprise a chain-transfer agent, a polymerization inhibitor and a curing agent. These additives make it possible to control the copolymerization of the monomer on the support polymer. The placing in contact of the membrane successively with grafting compositions comprising different additive contents will produce a membrane whose grafting is structured in the thickness.

In another recommended embodiment of the process according to the invention, at least two grafting compositions have different contents of polymerization additives. The degree of grafting in the thickness of the membrane may be controlled in this manner. According to this embodiment, it is also possible to obtain a membrane that is more or less cured in its surface zones relative to its inner layers by controlling the content of curing agent in the grafting compositions.

According to one particularly advantageous variant of this embodiment, at least one grafting composition previously placed in contact with the membrane has a content of at least one polymerization additive that is less than that of at least one bath subsequently placed in contact, the polymerization additive being a chain-transfer agent, an inhibitor or a curing agent, these additives advantageously being combined. To this end, the membrane is first placed in contact with a grafting composition from which these additives are sufficiently absent so as to obtain substantial surface grafting. Next, the membrane is placed in contact with a second grafting composition containing a sufficient amount of polymerization inhibitor and of chain-transfer agent, when the grafting front reaches the inner layers of the membrane. The precise contents of these additives in the grafting compositions will generally be determined on a case by case basis by a person skilled in the art as a function of the support polymer and the monomer to be grafted.

In this variant, when the grafting composition is intended to obtain ion-exchange sites (for example after an additional treatment such as a sulfonation), it has been observed that the process according to the invention makes it possible to produce membranes according to the invention having a very high density of exchange sites in the surface zone. In this variant, since the chain-transfer agent, the inhibitor and/or the curing agent is (are) not substantially placed in contact with the membrane until a later stage of the process, a very strong surface grafting effect is obtained, with long chains. When the contact time with the previous grafting composition is sufficiently short, the additives and in particular the inhibitor may even be totally absent from the composition. Moreover, the presence of the chain-transfer agent, the inhibitor and the curing agent in the grafting composition throughout the subsequent stage of the grafting, this subsequent stage advantageously corresponding to the grafting of more than 80% of the thickness of the membrane, makes it possible to keep all the advantages of the presence of these additives for the control of the polymerization and the curing. The in-depth curing of the membrane in fact improves its impermeability.

The membranes obtained in this variant may also be very hydrophilic at the surface.

It is recommended that the temperature of the grafting composition be at least 55° C. Temperatures above 95° C. are not advantageously. Advantageously, in the process according to the invention, the grafting composition subsequently placed in contact with the membrane is at a temperature above that of the composition previously placed in contact, the difference between these temperatures preferably being at least 10° C. and more preferentially 15° C. Values of between 55 and 65° C. for the first composition and between 75 and 85° C. for the second are particularly suitable.

Although the grafting compositions may be in gaseous form, or even in plasma form, in the process according to the invention, it is recommended for the grafting compositions to be in liquid form and for the placing in contact to be performed by immersing the membrane in at least two different baths. The composition of the baths may be constant over time, in which case the membrane is successively placed in contact with at least two different baths. In this case, the placing in contact may be batchwise, all of the amount of membrane produced being at a given moment in one given bath ("batch" mode) or continuous, different parts of the membrane being in different baths, the membrane being mobile. The composition of the baths may also change over time, by addition or even elimination of certain components. In this case, the membrane may stay in contact with only one bath.

In the process according to the invention, any grafting composition suitable for the membrane that it is desired to produce may be used. In particular, when it is desired to obtain ion-exchange membranes, the grafting composition depends on the cationic or anionic nature of the desired membrane. The grafting compositions advantageously comprise chloromethylstyrene (anionic membranes) or styrene (cationic membranes). Good results may also be obtained with optionally substituted fluorostyrenes. Examples of fluorostyrenes that may be mentioned include α-fluorostyrene, α,β-difluorostyrene, α,β,β-trifluorostyrene and the corresponding fluoronaphthylenes. The term "substituted fluorostyrene" means a fluorostyrene containing a substituent in the aromatic ring.

In particular, in the variant of the process described above (in which at least one grafting composition previously placed in contact with the membrane has a content of at least one polymerization additive less than that of at least one bath subsequently placed in contact), it is advantageous for the grafting composition containing less polymerization additive to comprise less than 1.6% and preferably less than 1% of curing agent relative to the volume of grafted monomer and/or less than 0.15% and preferably less than 0.05% of chain-transfer agent in the total volume of the grafting composition and/or less than 0.05%, preferably less than 0.04% and even more preferentially less than 0.03% of inhibitor relative to the weight of monomer included in the composition. In this variant, it is also advantageous for the grafting composition to be in liquid form and to contain styrene. Chain-transfer agents that may especially be used include hexanethiol and dodecanethiol. An example of a curing agent is divinylbenzene. In this variant, it is also recommended for the grafting composition comprising a larger amount of at least one polymerization additive to contain at least 2% of curing agent, at least 0.005% of chain-transfer agent and at least 0.005% of inhibitor, the percentages being defined, respectively, as above.

The process according to the invention, in particular its preferred variants, is especially suited to the production of the membranes according to the invention.

The ion-exchange membranes obtained via the process according to the invention, in particular those obtained via its preferred variants, have an excellent compromise between low electrical resistance and good impermeability. They find numerous applications in the field of fuel cells, preferably fuel cells running on methanol.

Consequently, the invention also relates to the use of the membranes according to the invention or those obtained via the process according to the invention in a fuel cell.

The invention also relates to a fuel cell comprising a membrane in accordance with the invention or obtained via the process according to the invention.

The examples that follow serve to illustrate the invention.

FIGS. 1, 2, 3 and 4 represent the profiles of sulfur and of carbon-fluorine in the thickness of the membrane, for the membranes obtained, respectively, in Examples 1, 2, 3 and 5.

In these examples, the process was performed in the following manner.

The irradiation of the membranes was performed in the presence of air under an electron beam at a voltage of 1.5 MeV and at a dose rate of 10 kGy/s. The dose deposited in the film is from 20 to 100 kGy. The irradiated membranes were stored at a temperature of less than or equal to −18° C. until the time of use. At −18° C., the irradiated membranes may be stored for 12 months with very little loss of reactivity.

The monomers, and more particularly those containing large amounts of stabilizers, for instance divinylbenzene (DVB) and chloromethylstyrene (CMS), were destabilized by washing in aqueous basic medium 0.1 M NaOH and then rinsed to neutral pH with demineralised water in a separating funnel. The destabilized monomers were stored at −18° C. until the time of use.

The ion conductivity, the water content and the exchange capacity of the membranes obtained were measured according to French standard AFNOR NF X45-200 December 1995.

The methanol permeability was measured at ambient pressure by introducing the studied membrane into a measuring cell with a cross section of 8.55 cm². The membrane delimited two 10 ml compartments. One of the faces of the membrane was exposed to a molar solution of methanol continually renewed at a constant rate of 24 ml/h. The second compartment was flushed with helium at a flow rate of 400 ml/min. The measuring cell was maintained at 25° C. The entrained vapours were condensed in two consecutive traps containing acetone at 2° C. The analysis of the condensate was performed by gas chromatography. Under the same measuring conditions, the Nafion® 117 membrane used as reference had a methanol permeability of 1215 g/m² day and a water permeability of 11 230 g/m² day.

The contact angle was measured with water and with diiodomethane (G2 measuring machine from Kruss).

The carbon and fluorine concentrations and/or sulfur concentration profiles were measured by X-ray microanalysis (SEM-EDX) on a section of the membrane obtained by cutting with a cryogenic microtome. The cross section of the sample is obtained by ultramicrotome smoothing at room temperature. It is then covered by cathodic sputtering with a thin conductive layer based on a platinum/palladium alloy. The examination is performed using a field-effect scanning electron microscope (FEG-SEM) of brand LEO 982, equipped with an X ISIS 300 microanalysis system from Oxford Instruments. The electron energy used is 20 keV. To measure a concentration profile, the X-ray signals of the elements to be monitored (sulfur, fluorine, optionally carbon and oxygen), emitted after incidence of the electrons along a chosen line parallel to the thickness of the membrane, are collected point by point, the displacement taking place by deflection of the electron beam using reels used for imaging. The concentration of the elements whose profile is measured is proportional to the intensity of the X-ray signal measured.

The presence and the accessibility of the sulfonate sites at the surface of the membrane was evaluated by immersing the samples for 1 minute in an aqueous solution containing 5 g/l of methylene blue, followed by measuring the L*a*b* coordinates in transmission with illuminant D65 and an observation angle of 10°.

To determine the exchange site densities $D_{total}$, and $D_{surface}$, the process was performed in the following manner. To obtain $D_{total}$, expressed in meq/cm³, the overall exchange capacity of the membrane, expressed in meq/g, is taken, which is measured according to French standard AFNOR NF X45-200 December 1995, and is multiplied by the density of the membrane, expressed in g/cm³. To obtain $D_{surface}$, the starting hypothesis taken is that the density of exchange sites is proportional to the density of sulfur. Starting with the sulfur concentration profiles, a mean sulfur concentration over the entire thickness ($C_{total}$) and over the surface zone ($C_{surface}$) is determined by graphic integration. These mean concentrations are such that the surface area of the profile located above the mean value is equal to the surface area located below, in the considered zone (at the surface only or over the entire thickness). $D_{surface}$ is then equal to $D_{total}$ multiplied by the ratio between the mean sulfur concentrations taken at the surface and throughout the thickness:

$$D_{surface} = D_{total} \times (C_{surface}/C_{total})$$

EXAMPLE 1

A grafting solution containing 30% by volume of non-destabilized styrene and 70% ethanol comprising 0.1 g/l of methylene blue was prepared. To this solution were added 3.15% by volume of pure divinylbenzene relative to the volume of styrene used and 0.055% by volume of 1-dodecanethiol relative to the total volume of the grafting solution. An ETFE membrane irradiated at a dose of 60 kGy was introduced into the grafting solution and the assembly was purged with nitrogen until an oxygen concentration of less than 100 ppm was obtained in the headspace of the reactor.

The grafting solution was maintained at a temperature of 80° C. for 16 hours. The degree of grafting obtained was 47%. The styrene grafted in the sample was then sulfonated for 12 hours at room temperature in a solution of 1,2-dichloroethane (DCE) containing 6% by weight of chlorosulfonic acid. The membrane was rinsed in DCE and then in ethanol for 1 hour. The sulfonate sites were finally obtained by hydrolysis of the chlorosulfonyl sites in an aqueous 0.1 M solution at 60° C. for 16 hours. The profile of sulfur distribution in the thickness of the grafted film showed that the grafting had penetrated down to the core of the film and comprised a less grafted zone at the surface (FIG. 1).

When measured in an aqueous 10 g/l NaCl solution, the membrane has a resistance of 1.8 Ω·cm². The water content is between 34.4% and 36% and the exchange capacity between 2.17 and 2.19 meq/g. The results of the methylene blue test indicate a low concentration of surface sites (L: 74.5; a: 41.9; b: 26.5) and the contact angle (86° with water and 57° with diiodomethane) indicate low wettability. The methanol permeability measured was 452 g/m² day.

The $D_{total}$ evaluated was 3.2 meq/cm³ and the $D_{surface}$, calculated on a zone representing 2% of the total thickness, was 3.0 meq/cm³.

EXAMPLE 2

Figure 2:
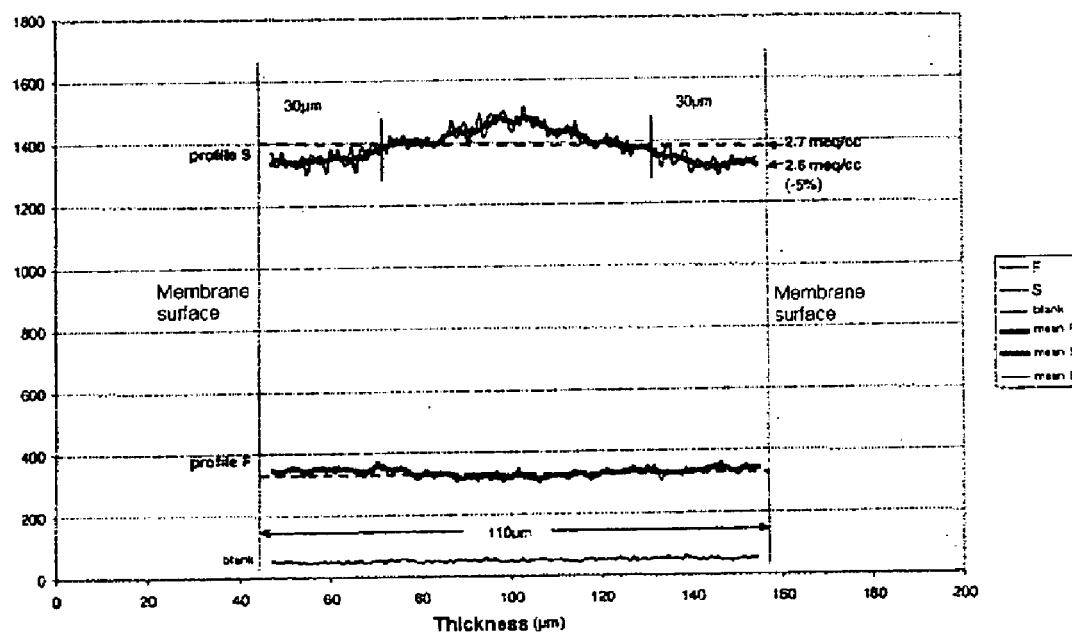
FIG. 2 shows the profile of sulfur distribution in the thickness of a grafted film having a gradient of grafting.

A grafting solution containing 20% by volume of non-destabilized styrene and 80% of ethanol containing 0.3 g/l of methylene blue was prepared. 4% by volume of pure divinylbenzene relative to the volume of styrene used and 0.050% by volume of 1-dodecanethiol relative to the total volume of the grafting solution were added to this solution. An ETFE membrane irradiated with a dose of 60 kGy was introduced into the grafting solution and the assembly was purged with nitrogen until an oxygen concentration of <100 ppm in the headspace of the reactor was obtained. The grafting solution was maintained at a temperature of 80° C. for 6 hours. The degree of grafting obtained is 35% to 40%. The membrane was then treated as in Example 1. The profile on the thickness of the membrane, of the signal for carbon and fluorine and sulfur showed that the grafting had penetrated down to the core of the film and comprised a gradient of grafting at depth of the film (FIG. 2).

When measured in an aqueous 10 g/l NaCl solution, the membrane has a resistance of 3.5 Ω·cm². The water content is 30% and the exchange capacity is 1.8 meq/g. The methylene blue test indicated a low concentration of surface sites. The methanol permeability was 566 g/m² day and the water permeability was 14 370 g/m² day.

The $D_{total}$ evaluated was 2.7 meq/cm³ and the $D_{surface}$, calculated on a zone representing 3% of the total thickness, was 2.6 meq/cm³.

EXAMPLE 3

Figure 3:
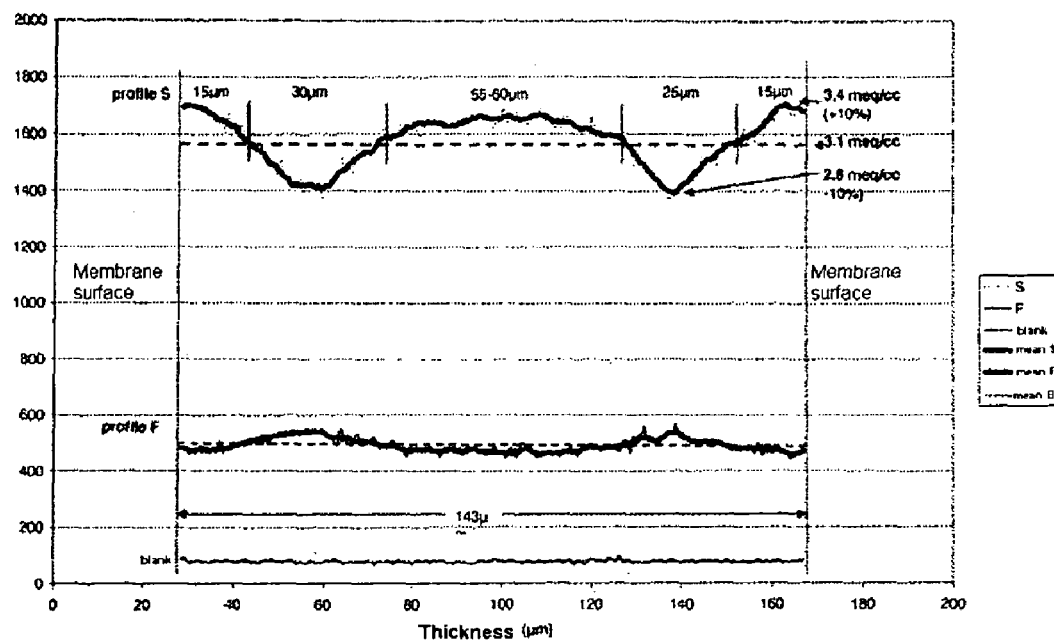
FIG. 3 shows the profile of carbon and fluorine distribution in the thickness of a grafted film enriched with grafted sites.

A grafting solution containing 30% by volume of non-destabilized styrene and 70% of ethanol comprising 0.1 g/l of methylene blue was prepared. An ETFE membrane irradiated with a dose of 60 kGy was introduced into the grafting solution and the assembly was purged with nitrogen until an oxygen concentration of less than 100 ppm in the headspace of the reactor was obtained. The grafting solution was maintained at a temperature of 60° C. for 12 minutes. Without interrupting the grafting, additional grafting solution was introduced with stirring so as to obtain a solution containing 0.02% of 1-dodecanethiol and 3.2% of DVB. The grafting was continued for 16 hours at a temperature of 80° C. The grafted film was washed with THF and dried at 60° C. for 1 hour. The degree of grafting determined by means of the weight gain relative to the weight of the starting film was 50%. The profile of the carbon and fluorine signals on the thickness of the grafted film showed that the surface of the film was enriched with grafted sites (FIG. 3).

The styrene grafted into the sample was then sulfonated and hydrolysed as in Example 1. When measured in an aqueous 10 g/l NaCl solution, the membrane has a resistance of 2.1 $\Omega \cdot cm^2$. The water content is 46% and the exchange capacity is 2.1 meq/g. The result of the methylene blue test indicates a high concentration of surface sites (L: 36.1; a: 6.9; b: 60.4) and the contact angle (12° with water and 49° with diiodomethane) indicates good wettability. The methanol permeability is 955 g/m² day and the water permeability is 10 330 g/m² day.

The $D_{total}$ evaluated was 3.1 meq/cm³ and the $D_{surface}$, calculated on a zone representing 3% of the total thickness, was 3.4 meq/cm³, i.e. 1.1 $D_{total}$.

EXAMPLE 4

A grafting solution containing 30% by volume of non-destabilized styrene and 70% of ethanol without methylene blue was prepared. An ETFE membrane irradiated with a dose of 60 kGy was introduced into the grafting solution and the assembly was purged with nitrogen until an oxygen concentration of less 100 ppm in the headspace of the reactor was obtained. The grafting solution was maintained at a temperature of 60° C. for 30 minutes. The grafting was interrupted by emptying the reactor under air. The partially grafted membrane was maintained at low temperature while awaiting the second grafting step. The degree of grafting measured as in Example 1 on a control sample indicated a degree of grafting of 13%.

The membrane was then introduced into a new grafting solution containing 30% by volume of non-destabilized styrene and 70% by volume of ethanol containing 0.1 g/l of methylene blue. To this solution were added 0.02% by volume relative to the total volume of solution of 1-dodecanethiol and 3.1% of pure DVB by volume relative to the volume of styrene. Grafting was continued for 16 hours at a temperature of 80° C. The grafted membrane was washed with THF and dried at 60° C. for 1 hour. The degree of grafting determined by means of the weight gain relative to the weight of the starting film was 44%.

The styrene grafted into the sample was then sulfonated and hydrolysed as in Example 1. When measured in an aqueous 10 g/l NaCl solution, the membrane has a resistance of 1.1 $\Omega \cdot cm^2$. The water content is 40% and the exchange capacity is equal to 2.0 meq/g. The result of the methylene blue test indicates a high concentration of surface sulfonate sites.

EXAMPLE 5

Figure 4:
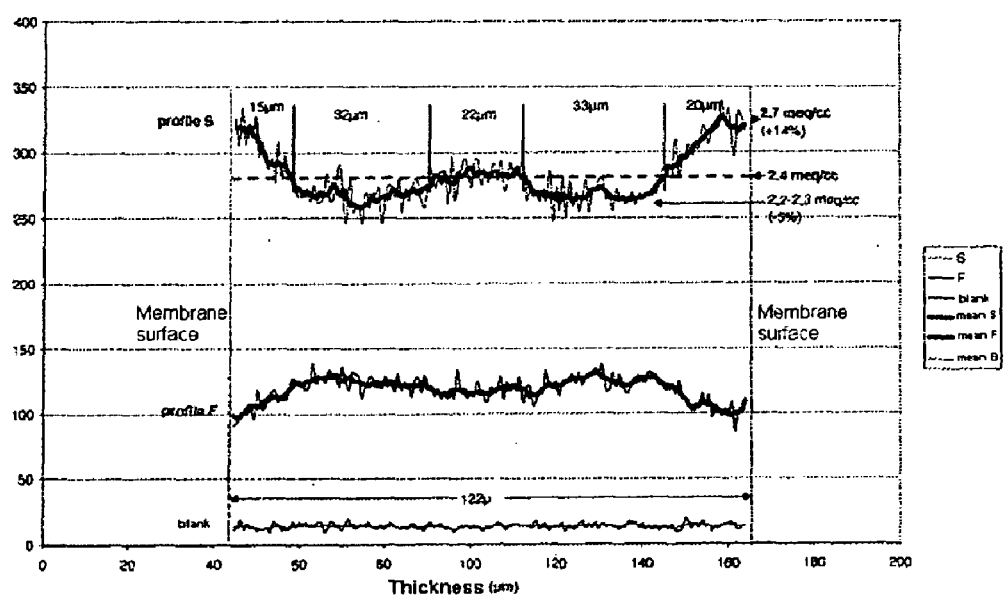
FIG. 4 shows the profile of carbon and fluorine distribution in the thickness of a grafted film enriched in sulfonate sites.

A grafting solution containing 30% by volume of non-destabilized styrene and 70% of ethanol containing 0.1 g/l of methylene blue was prepared. An ETFE membrane irradiated with a dose of 20 kGy was introduced into the grafting solution and the assembly was purged with nitrogen until an oxygen content of less than 100 ppm in the headspace of the reactor was obtained. The grafting solution was maintained at a temperature of 70° C. for 30 minutes. After deoxygenation, additional solution was introduced into the grafting reactor with stirring so as to obtain a grafting solution containing 0.045% of 1-dodecanethiol 3.2% by volume of pure DVB and 0.75% of CMS relative to the volume of styrene. Grafting was continued for 16 hours at a temperature of 80° C. The grafted membrane was washed with THF and dried at 60° C. for 1 hour. The degree of grafting determined by means of the weight gain relative to the weight of the starting membrane was evaluated as 37%. The profile on the thickness of the grafted membrane, of the carbon and fluorine signals, showed that the surface of the membrane was enriched in sulfonate sites (FIG. 4).

The styrene grafted into the sample was then sulfonated and hydrolysed as in Example 1. During the hydrolysis of the sulfonated styrene, the chloromethylstyrene was hydrolysed in benzyl alcohol form. When measured in an aqueous 10 g/l NaCl solution, the membrane had a resistance of 2.7 $\Omega \cdot cm^2$. The water content was 30% and the exchange capacity 1.6 meq/g. The results of the methylene blue test indicated low accessibility of the surface sulfonate sites (L 66; a –41.2; b –28.3) and the contact angle indicated low wettability (contact angle of 94° with water and 59° with diiodomethane). The methanol permeability was 831 g/m² day and the water permeability was 9430 g/m² day.

The $D_{total}$ evaluated was 2.4 meq/cm³ and the $D_{surface}$, calculated on a zone representing 5% of the total thickness, was 2.7 meq/cm³, i.e. 1.14 $D_{total}$.

EXAMPLE 6

A 100 μm membrane irradiated with 100 kGy was immersed in a grafting solution containing 20% by volume of destabilized CMS and 80% of ethanol containing 0.3 g/l of methylene blue. To this solution was added a volume of pure DVB corresponding to 2.4% of the volume of the CMS. After deoxygenation, the grafting reactor was maintained at 75° C. for 16 hours. The degree of grafting obtained was 48.8%. After amination in a solution of trimethylamine at 45% in water, followed by equilibration in a 10 g/l NaCl solution for 24 hours, the resistance of the membrane was between 3.6 and 4.7 $\Omega \cdot cm^2$. The membrane immersed for one minute in an aqueous solution of Congo red did not decolour, confirming the absence of surface quaternary amine sites.

EXAMPLE 7

A grafting solution containing 30% by volume of destabilized chloromethylstyrene and 70% of ethanol containing 0.1 g/l of methylene blue was prepared. A 100 μm ETF membrane irradiated with a dose of 80 kGy was introduced into the grafting solution and the assembly was purged with nitrogen until an oxygen concentration of less than 100 ppm in the headspace of the reactor was obtained. The grafting solution was maintained at a temperature of 75° C. for 30 minutes. The reactor was emptied under air. The degree of grafting obtained was 7.5%. After functionalization, the membrane did not conduct in 10 g/l NaCl. The test of the presence of anion exchange sites by immersion in Congo red was positive, indicating the presence of sites at the surface of the film.

EXAMPLE 8

A grafting solution containing 30% by volume of destabilized chloromethylstyrene and 70% of ethanol containing 0.1 g/l of methylene blue was prepared. A 100 µm ETFE membrane irradiated with a dose of 80 kGy was introduced into the grafting solution and the assembly was purged with nitrogen until an oxygen concentration of less 100 ppm in the headspace of the reactor was obtained. The grafting solution was maintained at a temperature of 75° C. for 30 minutes. The reactor was emptied under nitrogen. A new grafting solution deoxygenated beforehand was immediately introduced and the solution was maintained at 75° C. for 16 hours. The second grafting solution was prepared by mixing 30% by volume of destabilized CMS and 70% by volume of ethanol comprising 0.1 g/l of methylene blue. To this solution was then added a volume of pure DVB corresponding to 2.4% of the volume of the CMS. The degree of grafting obtained was 50.5%. After functionalization, as in Example 5, the membrane had a resistance of from 2.2 to 2.6 Ω·cm². The Congo red test is strongly positive and indicates a high concentration of surf-ace anion-exchange sites.

The invention claimed is:

1. A monolayer ion-exchange membrane structured in the thickness comprising ion-exchange sites covalently bonded to a support polymer, the membrane having a mean ion-exchange site density $D_{total}$ of at least 2.5 meq/cm³ when it is calculated on the total thickness of the membrane, the membrane comprising two surface zones located on either side of a mid-zone, each surface zone having a thickness of not more than 5% of the total thickness of the membrane, in which the surface zones have a mean ion-exchange site density $D_{surface}$ calculated on the thickness of the surface zones of at least $1.05 \times D_{total}$, and wherein the support polymer is at least one selected from the group consisting of a polyethylene, a polypropylene, a polyamide, a polyphenylene sulfide, a polyphenylene oxide and a polysulfone.

2. The monolayer ion-exchange membrane according to claim 1, in which $D_{surface}$ is at least $1.10 \times D_{total}$.

3. The monolayer ion-exchange membrane according to claim 1, obtained via a process including a step of radiochemical grafting.

4. The monolayer ion-exchange membrane according to claim 1, having a $D_{total}$ of at least 3 meq/cm³.

5. The monolayer ion-exchange membrane according to claim 1, wherein $D_{surface}$ is at least $1.15 \times D_{total}$.

6. The monolayer ion-exchange membrane according to claim 1, wherein the ion-exchange sites include one or more selected from the group consisting of a carboxyl group, a sulfonate group and a trimethylamine group.

7. The monolayer ion-exchange membrane according to claim 1, wherein the support polymer is at least one selected from the group consisting of a fluorinated polymer, a polyolefin, an aromatic polymer and a polyamide.

8. The monolayer ion-exchange membrane according to claim 1, wherein each surface zone has a thickness not more than 2% of the total thickness of the membrane.

9. The monolayer ion-exchange membrane according to claim 1, wherein $D_{surface}$ is from $1.05 \times D_{total}$ to $1.2 \times D_{total}$.

10. The monolayer ion-exchange membrane according to claim 1, wherein the ion-exchange sites are sulfonic groups.

11. The monolayer ion-exchange membrane according to claim 1, having an exchange capacity measured according to AFNOR NF X45-25 (December 1995) of from 1.6 meq/g to 2.19 meq/g.

12. The monolayer ion-exchange membrane according to claim 1, having no surface quaternary amine sites.

13. The monolayer ion-exchange membrane according to claim 1, wherein the ion-exchange sites are selected from the group consisting of a carboxyl group and a trimethylamine group.

* * * * *